No. 743,592. PATENTED NOV. 10, 1903.
F. & B. E. TERWILLEGER.
MACHINE FOR PICKING POULTRY.
APPLICATION FILED NOV. 24, 1902.
NO MODEL. 3 SHEETS—SHEET 1.
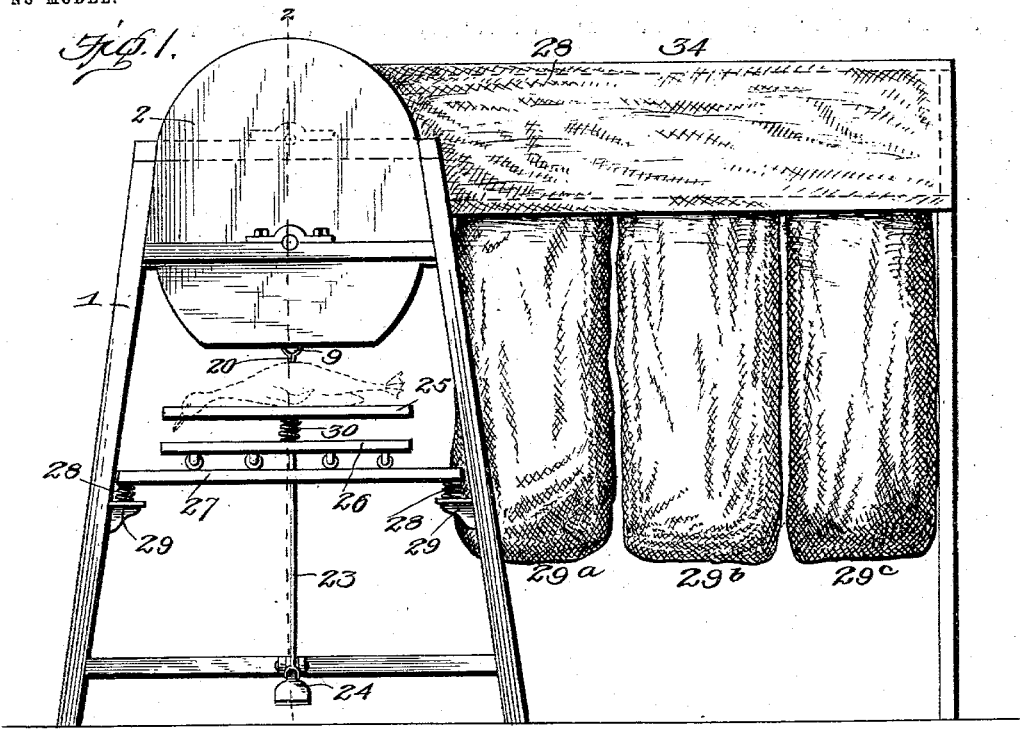
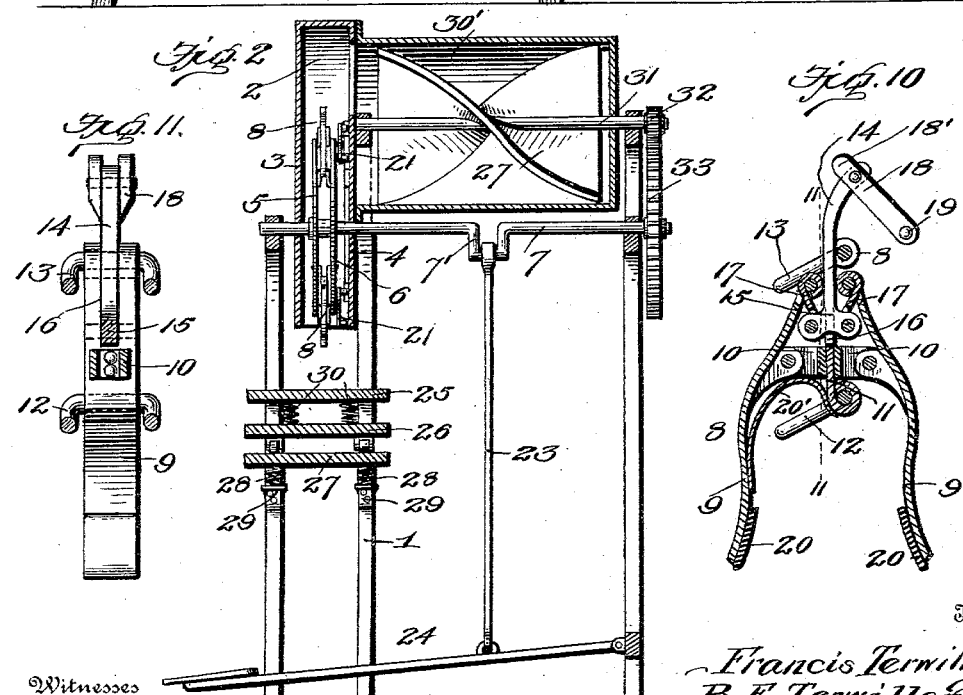
Inventors
Francis Terwilleger
B. E. Terwilleger No. 743,592. PATENTED NOV. 10, 1903.
F. & B. E. TERWILLEGER.
MACHINE FOR PICKING POULTRY.
APPLICATION FILED NOV. 24, 1902.
NO MODEL. 3 SHEETS—SHEET 2.
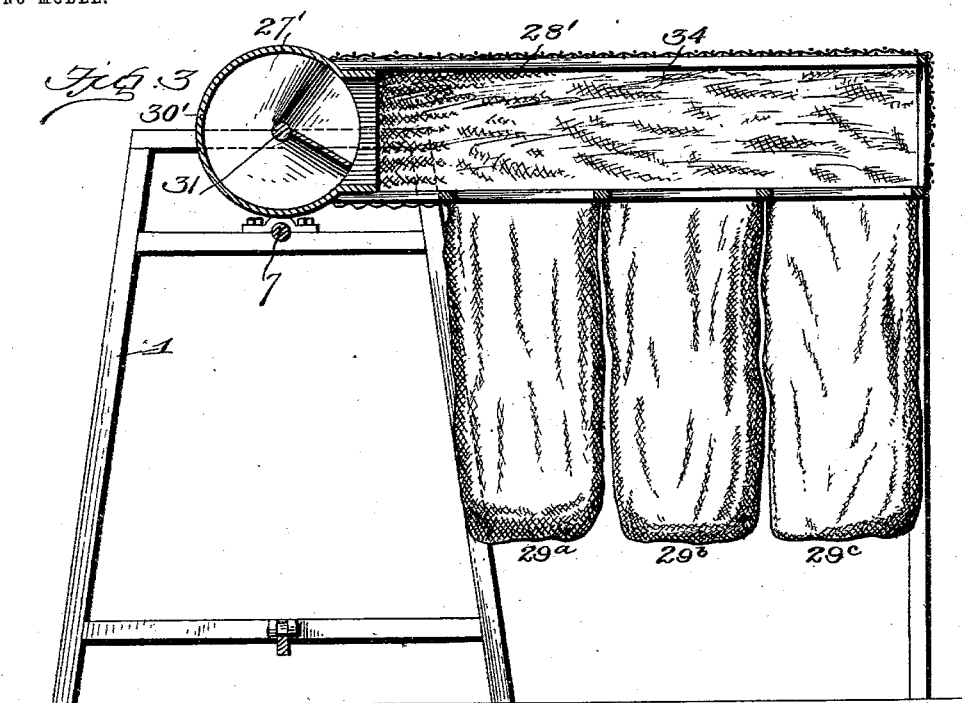
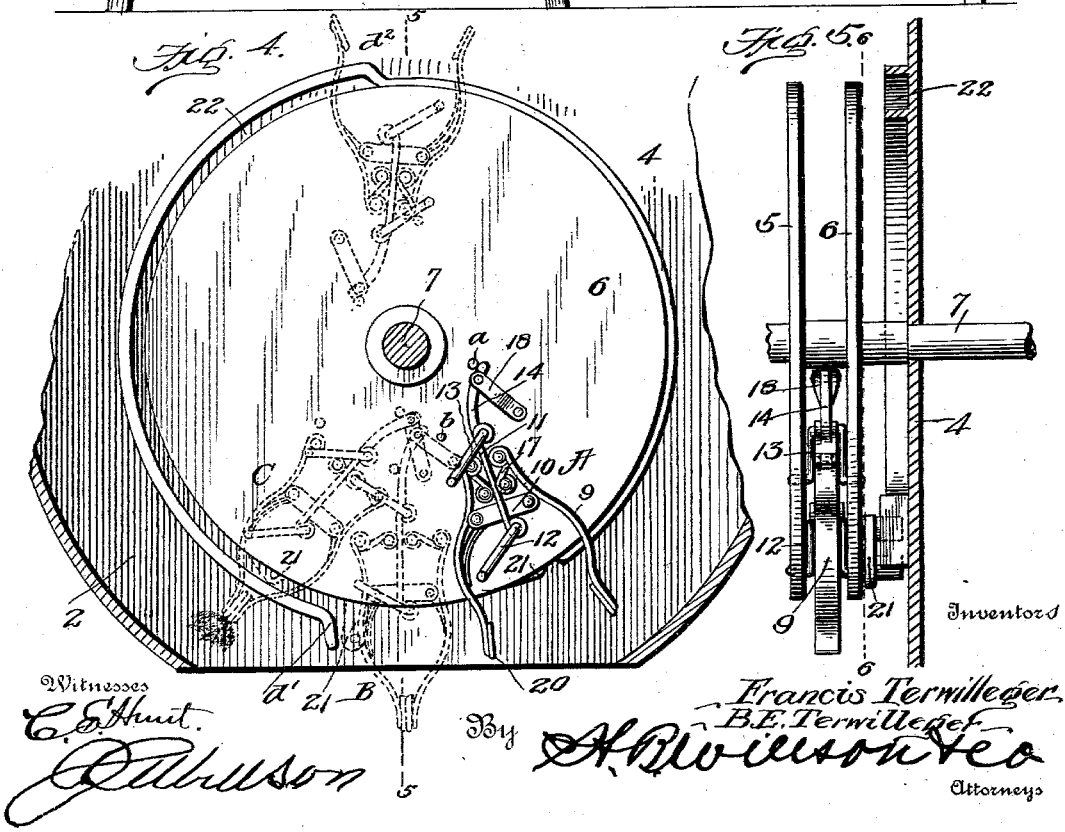

No. 743,592. PATENTED NOV. 10, 1903.
F. & B. E. TERWILLEGER.
MACHINE FOR PICKING POULTRY.
APPLICATION FILED NOV. 24, 1902.
NO MODEL. 3 SHEETS—SHEET 3.
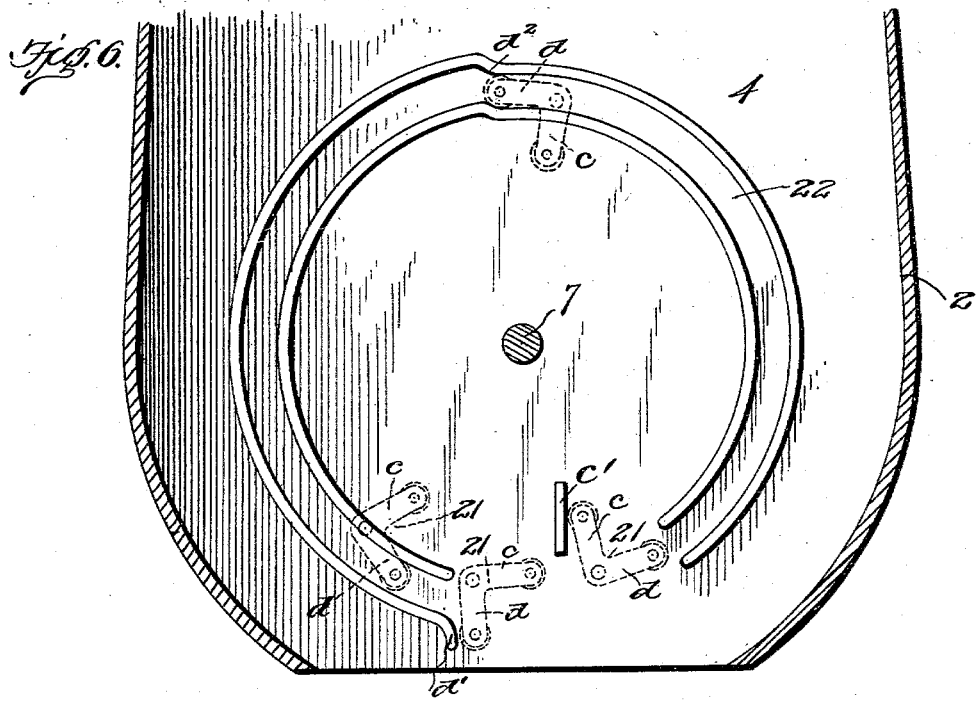
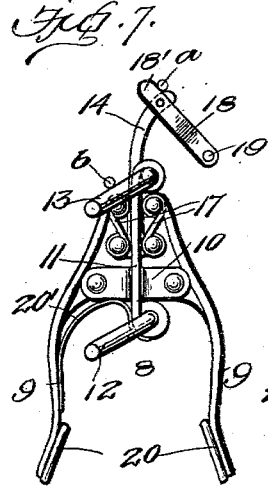
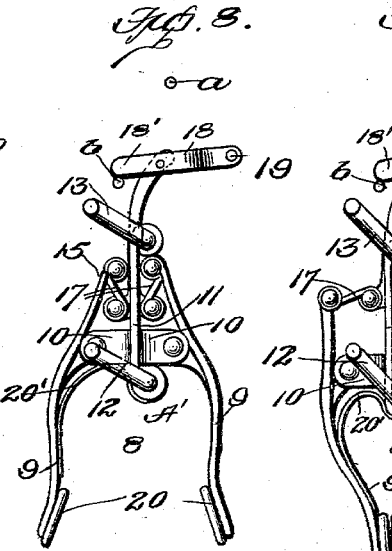
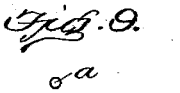
Witnesses
Inventors
Francis Terwilleger.
B. E. Terwilleger.
By H. B. Willson & Co
Attorneys No. 743,592. Patented November 10, 1903.

UNITED STATES PATENT OFFICE.

FRANCIS TERWILLEGER AND BERTRAND EUGENE TERWILLEGER, OF BROOKHAVEN, NEW YORK.

MACHINE FOR PICKING POULTRY.

SPECIFICATION forming part of Letters Patent No. 743,592, dated November 10, 1903.

Application filed November 24, 1902. Serial No. 132,596. (No model.)

*To all whom it may concern:*

Be it known that we, FRANCIS TERWILLEGER and BERTRAND EUGENE TERWILLEGER, citizens of the United States, residing at Brookhaven, in the county of Suffolk and State of New York, have invented certain new and useful Improvements in Machines for Picking Poultry; and we do declare the following to be a full, clear and exact description of the invention, such as will enable others skilled in the art to which it appertains to make and use the same.

This invention relates to a machine or apparatus for picking poultry.

The object of the invention is to provide an apparatus of this character adapted to perform the work of picking or removing the feathers efficiently and quickly without bruising or otherwise injuring the flesh of the fowl.

To this end the invention consists of certain novel features of construction, combination, and arrangement of parts, as will be hereinafter more fully described, and particularly pointed out in the appended claims.

In the accompanying drawings, Figure 1 is a front elevation of a poultry-picking machine embodying our invention. Fig. 2 is a vertical transverse section on line 2 2 of Fig. 1. Fig. 3 is a vertical section taken at right angles to Fig. 2 through the frame, fan-casing, and chute and showing the feather-receiving compartment. Fig. 4 is a front view of the rear disk of the rotating head and a fragment of the frame or casing, showing in full and broken lines the several positions of one of the pickers, indicating the picker approaching the picking position with jaws open, jaws closed to grip a bunch of feathers, the picker retracted to remove the feathers from the fowl, and the picker with its jaws opened to discharge the picked feathers and ready again to move to the first-named position to pluck feathers from the fowl. Fig. 5 is a central vertical section through the picker-head on a line coincident with line 5 5 of Fig. 4. Fig. 6 is a front or inner side view of the rear wall of the casing, showing the guide-groove and also showing in full and broken lines the several positions of the bell-crank levers corresponding to the positions of the picker shown in Fig. 4. Figs. 7, 8, and 9 are diagrammatic elevations showing the action of a picker in its several movements. Fig. 10 is a sectional view illustrating the construction of the picker. Fig. 11 is a detail section on line 11 11 of Fig. 10.

1 in the drawings denotes a frame of suitable size and construction to receive and support the operating parts and having mounted thereon a casing 2 to receive and inclose the picking mechanism, the said casing 2 being formed by connected front and back walls 3 and 4 and being open at its lower end to allow the pickers hereinafter described to project therefrom for operation in removing the feathers from the fowl.

The picking mechanism comprises in its construction a rotating head or carrier consisting of two spaced disks 5 and 6, mounted upon an operating-shaft 7, suitably journaled in the frame and carrying a series of picking devices 8, each consisting of a pair of jaws 9, pivoted intermediate of their ends to ears 10, formed or provided upon a plate or frame-piece 11, extending longitudinally between the jaws, the said frame-piece being pivotally mounted at its ends upon cranks 12 and 13, journaled at their ends in the two disks 5 and 6, as clearly shown in Figs. 2 and 5. The jaw-operating bar 14 is provided at one end with a cross-piece 15, which slides in a longitudinal slot 16, formed in said frame-piece, and this cross-piece is connected to the inner ends of the jaws by links 17, so that a sliding movement of the cross-piece in the slots 16 will cause the outer or free ends of the jaws to open or close, according to the direction of movement of said cross-piece. The opposite or inner end of the bar 14 is pivoted to a swinging guide-link 18, which is in turn pivotally mounted at 19 upon a pin or projection extending from one of the said heads 5 and 6. The guide-link 18 has an extended end 18', which plays between two stops or contacts $a$ and $b$, formed upon the rear disk 6 of the rotating head, as clearly shown in Fig. 4. The outer ends of the jaws are provided with flexible tips or gripping portions 20, which project beyond the ends of the jaws and are adapted to grip the feathers upon the fowl to be plucked without injury thereto, the flexible tips or portions preventing the metal of the jaws from contacting with the fowl. By the construction of the pickers as above described it will be seen that when the cranks 12 and 13 are swung in one direction to move the link 18 from the contact $a$ to the contact $b$ the picker as a whole will be projected below or beyond the edges of the disks 5 and 6 until the end 18' of the link engages said contact $b$, when a further movement of the link 18 and bar 14 will be arrested, and a continued swinging movement of the cranks will cause the cross-piece 15 to slide in the slot 16 of the frame-piece 14, and thereby bring the link 17 into alinement, so as to spread the inner ends of the jaws 9 and close the outer ends thereof together, thus bringing the tips 20 into contact. Upon a reverse swinging movement of the cranks 12 and 13 the picker as a whole will be swung inwardly or retracted until the portion 18' of the guide-link 18 again engages the contact $a$, when the further inward movement of the bar 14 will be arrested, and a continued inward movement of the cranks will cause the cross-piece 15 to again move downward in the slot 16, thus drawing the link 17 down between the jaws and spreading the outer ends of the jaws apart, as illustrated in the position shown in Fig. 10. The opening movement of the jaws is assisted or promoted by means of a suitable spring 20, which bears at one end against one of said jaws and at its opposite end against the outer extremity of the frame-piece 14.

Connected to the crank 12 of each picker is a bell-crank lever 21, whose arms $c$ and $d$ are provided with friction-rollers to insure ease of operation, the said arms being so arranged as to coöperate with suitable operating means on the back plate 4 of the casing 2 to project and retract the picker and open and close the jaws of the same as it moves into operative position to pluck the feathers from the fowl and reaches a point in the path of movement where the feathers are to be discharged. As shown, the plate 4 is provided with a nearly circular grooved guideway 22, the ends of which are separated or spaced apart at the lowest point of the guideway and one of the ends of which is provided with a contact-point $d'$. On the back 4 is a contact-piece $c'$, which coöperates with the contact-piece $d'$ in effecting the adjustment of the bell-crank levers 21, and at the highest point of the guideway is provided a cam portion $d^2$, which also operates the bell-crank lever to effect a certain movement of the picker. The rotary head is fixed upon the shaft 7 to rotate therewith, and the gripping ends of the jaws 9 normally project a certain distance therefrom and are capable by the adjustability of the picker, as previously described, to be projected to a greater extent and retracted to their normal position. The operation of the jaws whereby they are projected and retracted to grip, pluck, and discharge the feathers will be hereinafter more fully described.

The shaft 7 is provided with a crank portion 7', which is connected by a rod 23 with a treadle or operating lever 24, which is so arranged that an operator standing at the front of the machine may move the treadle up and down, and thereby communicate motion to said shaft to rotate the head to bring the picking devices, of which any desired number may be provided upon the head, in succession into operation to pluck the feathers from the fowl and discharge the plucked feathers at the suitable point, whence they may be conveyed to a suitable receptacle.

The fowl to be picked or plucked is supported upon a table 25, located immediately below the casing 2 and mounted upon a traveling carriage 26, having wheels or rollers to move over or along a platform 27, yieldingly supported by springs 28, mounted upon shelves 29, suitably fixed to the frame. The preferred way for yieldingly supporting the table 25 from the carriage 26 is to provide the interconnecting coiled or spiral springs 30, located intermediate of the length of said table, so that the table may be tilted in either direction to present different portions of the fowl lying thereon to the action of the pickers. By thus yieldingly mounting the table on the platform 27 the table may not only tilt to accomplish the function set forth, but both the table and platform are adapted to yield in a vertical plane to suit fowls of different sizes and to adapt the fowl upon the table to yield to a greater or less extent should a picker come in direct contact therewith, whereby bruising of the flesh of the fowl or other injury thereto will be effectually prevented. It will be seen by reference to Fig. 1 that a person standing at the front of the machine may operate the treadle-lever 24 to rotate the picker carrying-head, and at the same time may manipulate the table 25 to bring different portions of the upper or exposed surface of the fowl into position to be operated upon by the pickers and also may move the fowl longitudinally to better attain this end through the medium of the carriage 26.

In Fig. 4 of the drawings we have indicated in full and broken lines the different positions of the picker during the rotation of the carrying-head and effected by the operation of the bell-crank lever 21 through the instrumentality of the contacts $c'$ and $d'$ and the cam $d^2$. In the full-line position, denoted A, the jaws of the picker are shown as open in readiness for operation, and upon the revolution of the head in the direction of the arrow shown in said figure it will be seen that when the picker reaches position denoted B it will be projected below the casing 2 and the jaws will be closed to grip a portion of the feathers of the fowl resting on the table 25. This change in the position of the picker as a whole and of the jaws is accomplished in the following manner: By reference to Fig. 6, which shows the corresponding positions of the bell-crank lever 21 when the jaws are in the positions shown in Fig. 4, it will be seen that the arm $c$ of the bell-crank lever is in engagement with the stop $c'$ and that as the carrying-head continues to rotate this arm will be pushed upon and the bell-crank lever brought to the lower intermediate position B, in which the arm $d$ of the bell-crank lever is about to contact with the stop or contact portion $b'$. In thus moving from position A to position B the cranks 12 and 13 are swung in the direction to project the gripper outwardly as it comes immediately above the center of the table 25, said movement of the cranks first swinging the picker as a whole outwardly until the guide-link 18 contacts with the stop $b$, when as the further movement of the bar 14 will be arrested the further swinging of the cranks will cause the slotted frame-piece 11 to slide outward independent of said bar, as the slot 16 allows the cross-piece 15 to remain stationary while the frame-piece is moved, such outward movement of the frame-piece and jaws drawing upon the links 17, whereby said links are moved from the position shown in position A in Fig. 4 to the position shown in position B of the same figure, thereby closing the engaging ends of the jaws together to cause them to grip a number or bunch of feathers of the fowl lying on table 25. As soon as the picker grips the feathers it is quickly drawn up and retracted to pluck the feathers from the fowl in the following manner: The further movement of the carrying-head in its direction of rotation causes the arm $d$ of the bell-crank lever to engage the contact $d'$, whereby said lever is swung to the position denoted C in Fig. 4, so that the friction-roller on said arm $d$ enters one end of the grooved guideway 22 and effects a partial swing of the cranks 12 and 13, this swing being sufficient to retract the picker, but not sufficient to move it forwardly to such an extent as to open the jaws and release the feathers therefrom. This position of the picker is shown in Fig. 4, in which it appears in dotted lines, and is denoted position C.

It will be apparent from the foregoing description that the aforesaid partial reverse swing of the cranks 12 and 13 will cause the picker to move as a whole or bodily upward until the link 18 swings back into contact with stop $a$, at which point the movement is arrested, as the guideway 22 will maintain the parts in this position and will prevent the picker from being swung farther inward to open the jaws to release the feathers until the described point in the path of revolution of the rotary carrying-head is reached. When the picker in its course of travel reaches the position denoted D in Figs. 4 and 6, the friction-roller of the arm $d$ of the bell-crank lever 21 will engage the cam portion $d^2$ of the guideway 22, and this cam portion will effect the further inward swing or movement of the cranks 12 and 13, whereby as the link 18 is in contact with the stop $a$ and has no further movement the frame-piece 11 will slide inward on the cross-piece 15 and swing the link 17 inward and the jaws open, in which operation it will be assisted by the spring 21. The feathers carried by the jaws will thus be released and allowed to discharge, the operation of discharging the feathers being accomplished in the manner hereinafter described. In the further movement of the rotating carrying-head the arm $d$ of the bell-crank lever will be maintained in the last-mentioned position, and the jaws of the picker will be held open until the picker again reaches the position B, when said picker will be projected and the jaws closed to grip a bunch of feathers in the manner previously described.

In Fig. 4 I have represented the closing of the jaws between the positions A and B as being accomplished by one movement; but it should be stated that while this is practically so there is an intermediate position between positions A and B, in which the jaws while projected, as shown in Fig. 4, remain open until they come immediately above the fowl on the table 25, when by the further or final movement of the cranks 12 and 13, previously described, they are quickly closed together to grip a bunch of feathers between them. This intermediate position is indicated by the position denoted $A'$ in Fig. 7.

It will thus be seen that in the operation of the picking devices, of which any number may be provided on the rotating carrier-head, the picker with the jaws in open position is first projected toward the fowl, the jaws then closed to grip some of the feathers between them, then retracted quickly while in closed position to pluck the feathers, and finally opened to release the feathers, the operation of engaging and plucking the feathers being accomplished while the picker is moving across or along the fowl without being in actual contact therewith, so that injury to the fowl will be effectually avoided—a most essential advantage, which could not be obtained if the picking device were movable solely toward and from the fowl. The feathers when released by the pickers are drawn by the suction produced by a fan $27'$ into a discharge-chute $28'$, whence they fall, according to their specific gravity, into either one of a series of bags or receptacles $29^a$, $29^b$, and $29^c$, arranged below said chute with their mouths in open communication therewith. As shown, the fan 27 is arranged within a casing $30'$, which is in communication with the casing 2 and is mounted upon a shaft 31, connected by means of an intermeshing pinion 32 and gear-wheel 33 with the crank-shaft 7, whereby the rotating picker-head and shaft are simultaneously driven. The chute 28 preferably consists of a suitable framework of wood or metal, covered to form an inclosure with a diaphanous fabric 34, such as jute or cheese-cloth, which will allow blasts or currents of air to circulate therethrough, but will prevent the escape of the feathers. On their discharge the feathers are assembled and graded, being separated according to their fall by their different specific gravities, the heavier feathers falling into the bag 29ª, the lighter ones into the bag 29ᶜ, and those of medium weight into the bag 29ᵇ, thus enabling those of marketable value to be removed and disposed of without hand picking or grading.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described our invention, what we claim as new, and desire to secure by Letters Patent, is—

1. In a poultry-picking device, picking mechanism comprising a stationary support, a rotary carrier, a picker mounted on said carrier, said picker comprising a pair of pivoted jaws slidably mounted so as to have an in-and-out radial movement, means for rotating the carrier, and means for sliding the picker in and out and simultaneously opening or closing the jaws at certain points in the path of revolution of the carrier, substantially as described.

2. In a poultry-picking device, picking mechanism comprising a stationary support, a rotary carrier, a picker mounted on said carrier, said picker comprising a pair of pivoted jaws, a radially-sliding frame-piece, means for sliding said frame-piece, means having a slidable connection with said frame-piece for opening and closing said jaws, and means for rotating the carrier, substantially as described.

3. In a poultry-picking device, picking mechanism comprising a stationary support, a rotary carrier, a picker mounted on said carrier, said picker comprising a pair of pivoted jaws, a radially-sliding frame-piece, means for sliding said frame-piece to project and retract the picker as a whole, links slidably connected to the frame-piece and adapted by the sliding movement of the latter to open and close the jaws as the picker is moved in one direction or the other, and means for rotating the disk and sliding said frame-piece, substantially as described.

4. In a poultry-picking device, picking mechanism comprising a stationary support, a rotary carrier, a picker mounted on said carrier, said picker comprising a pair of pivoted jaws, a slidable frame-piece for bodily projecting and retracting the picker, an operating device having a slidable connection with said frame-piece and linked to the jaws to open and close said jaws at predetermined points in the projective and retractive movements of the picker, stops on the carrier, a swinging link connected to the operating device and adapted to engage said stops to limit the movement of the operating device, means for sliding said frame-piece, and means for rotating the carrier, substantially as described.

5. In a poultry-picking device, picking mechanism comprising a stationary support, a rotary carrier, a picker mounted on said carrier, said picker comprising a pair of pivoted jaws, a slidable frame-piece for bodily projecting and retracting the picker, an operating device having a slidable connection with said frame-piece and linked to the jaws and operated by the frame-piece at certain points in the path of movement thereof to open and close the jaws, means for limiting the movement of the operating device, a crank connected to the frame-piece, a cam on the support, a bell-crank lever operated by said cam and connected to said crank to slide the frame-piece in and out at predetermined points in the path of movement of the carrier, and means for rotating said carrier, substantially as described.

6. In a poultry-picker, the combination with means for supporting a fowl to be picked, of a rotary carrier, a series of pickers mounted on said carrier, each of said pickers comprising jaws, means for opening and closing the jaws, cranks for projecting and retracting the pickers, and suitable operating mechanism, substantially as set forth.

7. In combination, means for supporting a fowl, a picker having gripping members to grip and pluck the feathers from the fowl, means for moving the picker past the fowl, and means for projecting the picker toward the fowl and closing the jaws and then retracting the picker to pluck the engaged feathers, such projecting and retracting movements occurring as the picker moves past the fowl, substantially as set forth.

8. In combination, means for supporting a fowl, a rotary head carrying pickers each comprising a frame and pivoted jaws, a swinging member slidably connected to the frame for projecting and retracting, opening and closing the jaws, means for rotating the head, and means for operating and limiting the movements of said member to project, retract, open and close the jaws at determined intervals.

9. In combination, means for supporting a fowl, a rotary head carrying pickers each comprising a frame and pivoted jaws, a swinging member slidably connected to the frame for projecting and retracting, opening and closing the jaws, means for rotating the head, cranks mounted on the head and carrying the jaws, and means for operating the cranks to swing the jaws and said swinging member, substantially as set forth.

10. In combination, means for supporting a fowl, a rotary head carrying pickers each comprising a frame-piece and jaws pivoted thereto, a crank for projecting and retracting the pickers, a pivoted member having a sliding engagement with the frame of each picker, means for operating the cranks, and means for limiting the swing of said pivoted members, whereby, the picker swings to a limited extent inward and outward without affecting the jaws and then, according to the extent of the swinging movement, the jaws are forced open or closed, substantially as set forth.

11. In combination, means for supporting a fowl, a rotary head, a picker carried thereby and comprising cranks, a frame-piece pivotally connected with the cranks, jaws pivoted intermediately to the frame-piece, a pivoted swinging bar, links connecting the inner ends of the jaws and pivoted to the bar and slidably connected with the frame-piece, means for rotating the head, means for operating the cranks, and means for restricting the swing of the bar to a distance less than that of the jaws, whereby a preliminary movement of the cranks first projects or retracts the picker a certain distance and the final movement of the same completes the movement of the picker and opens or closes said jaws, substantially as set forth.

In testimony whereof we have hereunto set our hands in presence of two subscribing witnesses.

FRANCIS TERWILLEGER.
BERTRAND EUGENE TERWILLEGER.

Witnesses:
  J. HAYES TURNER,
  KATHERINE TERWILLEGER.